Aug. 18, 1964 L. H. RIDDELL 3,144,819
APPARATUS FOR TREATING WATER-BORNE REFUSE
Filed March 1, 1962 5 Sheets-Sheet 1
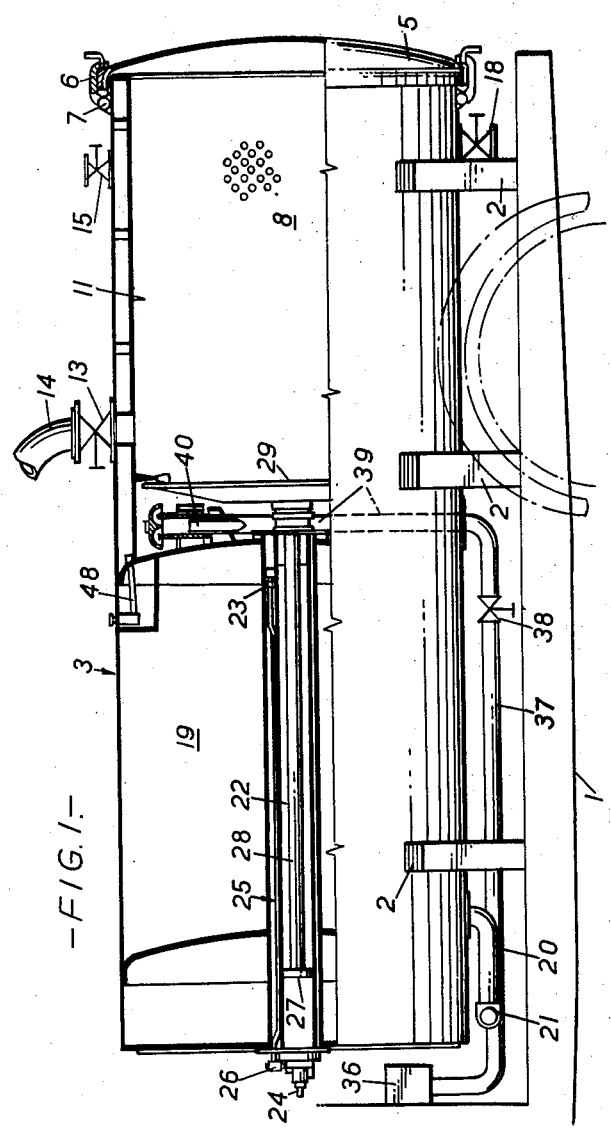
INVENTOR:
LEONARD H. RIDDELL
BY
Abraham A. Saffitz
ATTORNEY Aug. 18, 1964     L. H. RIDDELL     3,144,819
APPARATUS FOR TREATING WATER-BORNE REFUSE
Filed March 1, 1962     5 Sheets-Sheet 2
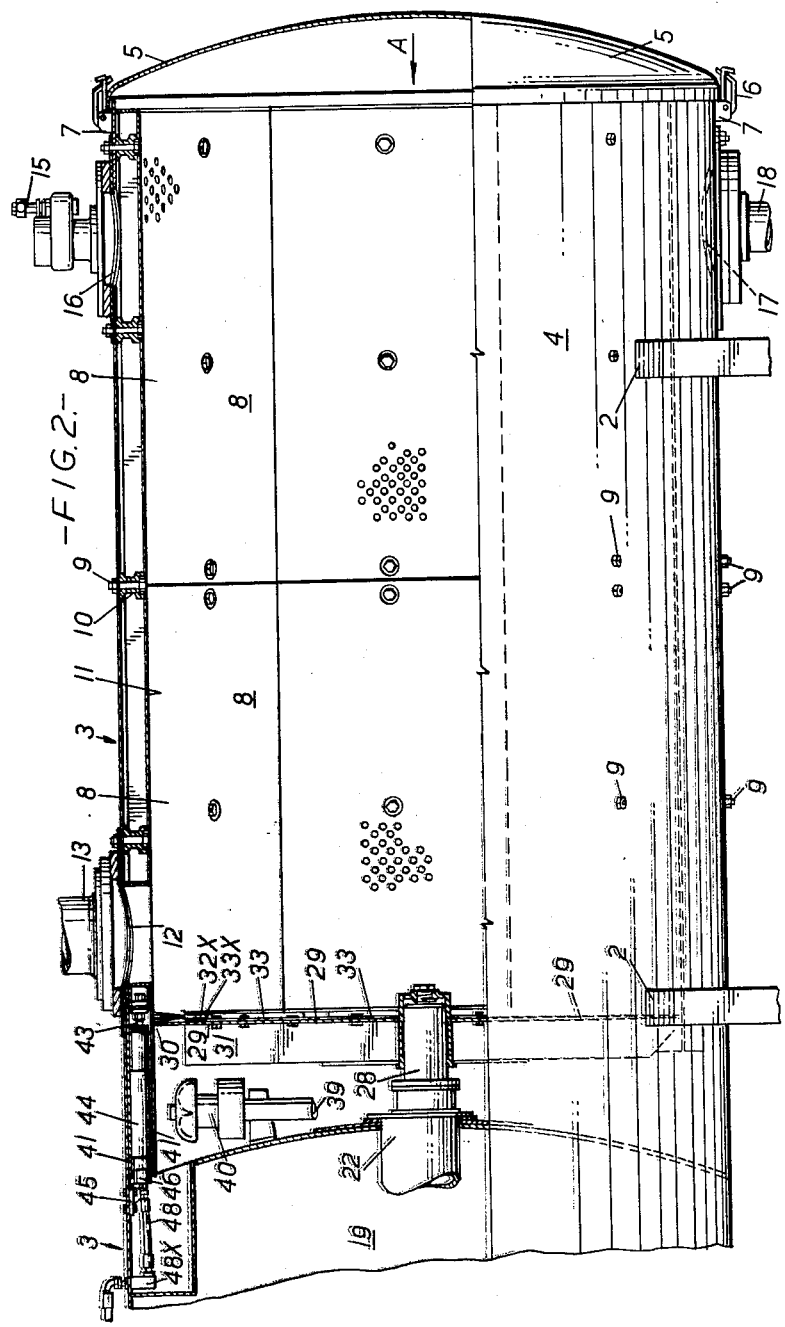
INVENTOR:
LEONARD H. RIDDELL
BY Abraham A. Saffitz
ATTORNEY

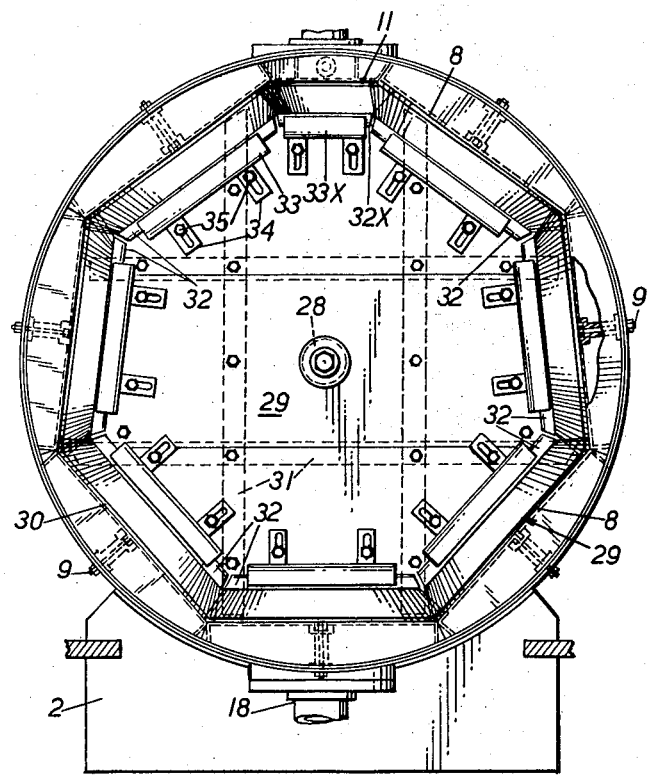
-FIG 3-
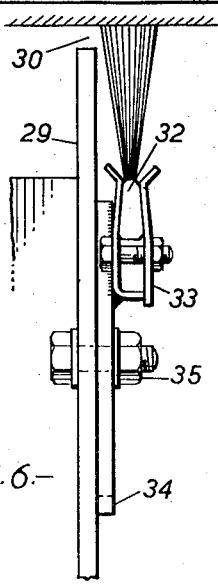
-FIG. 6.-

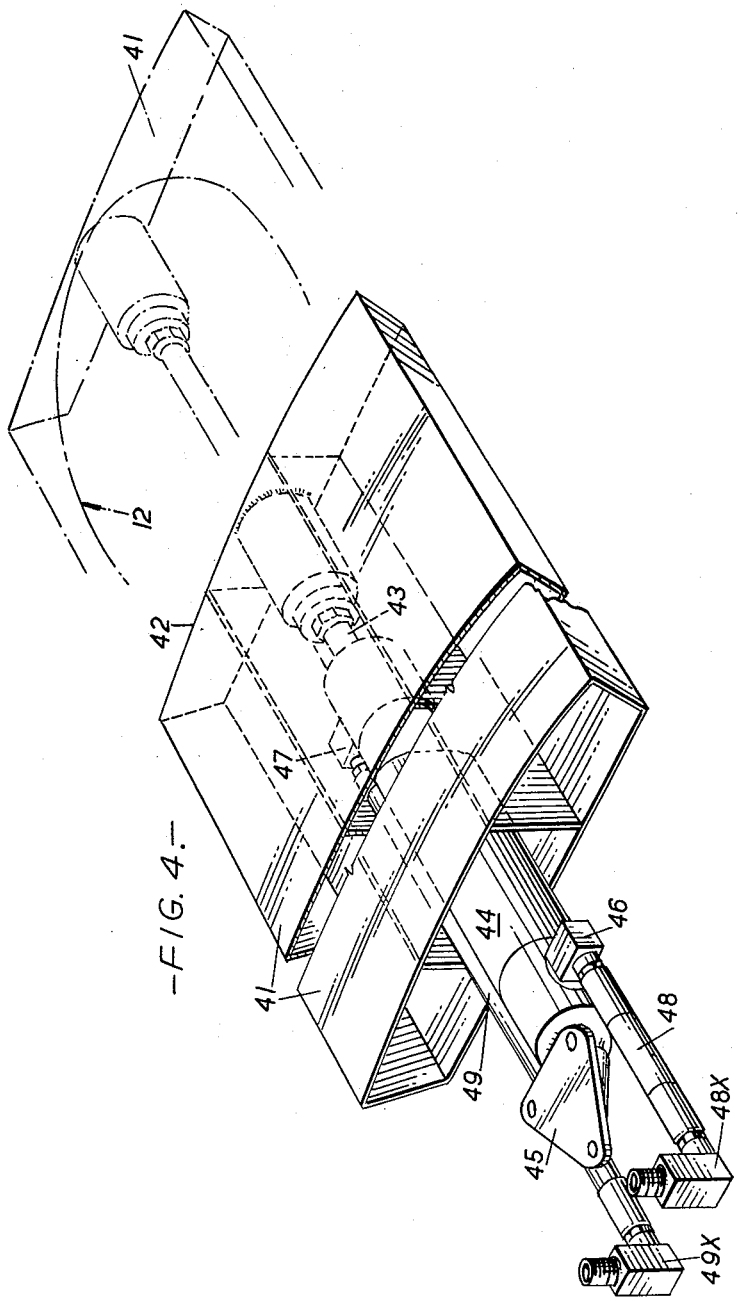

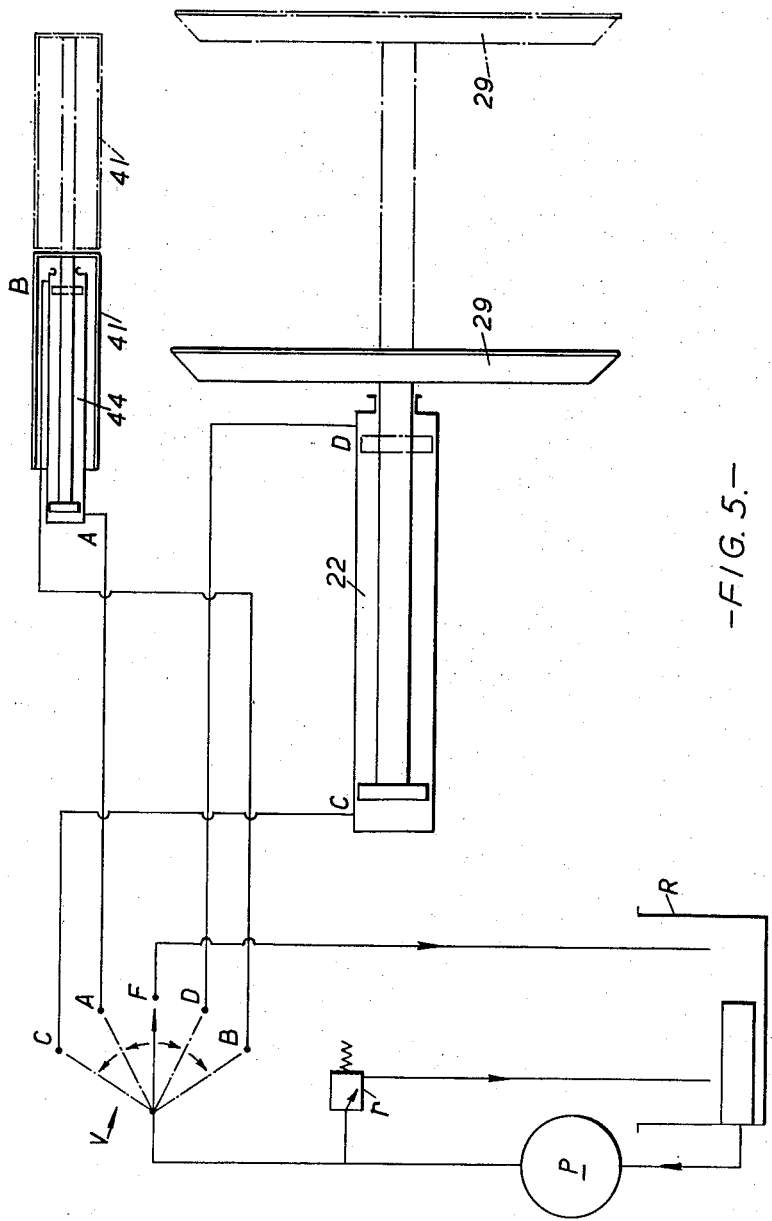

United States Patent Office 3,144,819
Patented Aug. 18, 1964

3,144,819
APPARATUS FOR TREATING WATER-BORNE REFUSE
Leonard H. Riddell, 3 Kent Road N.,
Harrogate, England
Filed Mar. 1, 1962, Ser. No. 176,547
1 Claim. (Cl. 100—112)

This invention relates to apparatus for treating water-borne domestic and like refuse to separate it from its flushing or carrying water and to dispose of it. The apparatus may be static so that the solid refuse, after separation from the flushing water, is removed therefrom to a destructor forming part of the disposal plant or to a distant dumping ground, but preferably the apparatus is mobile and mounted upon a vehicle or wheeled chassis so as to be capable of transporting the solid refuse to a destructor or dumping ground away from the collection site.

A system of refuse collection and disposal is known under the British Registered Trade Mark "Garchey" in accordance with which the flushing water which carries the refuse to a collecting chamber is thereafter removed by syphoning off and by use of a centrifuge or rotary hydro-extractor.

The chief object of the present invention is to provide an improved apparatus for treating such water-borne refuse, which apparatus will be well adapted for dealing with the bulky solids which are often involved in water-borne systems but will simplify the process and reduce the amount of plant required. In its preferred form the invention aims at separating the flushing water from the solid refuse at the collection site and transporting the solid refuse to a destructor or dumping ground away from the buildings producing the refuse, all in a simple and rapid manner.

Thus an apparatus according to this invention includes a refuse tank, means for producing partial vacuum conditions therein, suction inlet means for the water-borne refuse and of large enough capacity to pass the bulky refuse to be handled, a pusher plate device located in said tank, perforated strainer means forming a lining for said tank, means for reciprocating said plate so as to compress the refuse and expel surplus liquid, brushing or scraping means for cleaning said perforated lining, and separate outlet means from the tank for the resultant solid refuse and for the liquid respectively.

Preferably the pusher plate carries brushes arranged to clean the strainer means as the plate moves. Also the inlet opening to the tank for the water-borne refuse is located at the forward end of the tank, that is the end from which the pusher plate operates when compressing the refuse, and is protected by a movable closure member across which, when in its closed position, the pusher plate moves. The use of this closure member ensures that as the pusher plate moves past the inlet opening on its refuse-compressing stroke, there will be no risk of bulky refuse being forced out of the tank back into the opening and then falling back into the tank behind the plate and thereby passing to the water disposal unit or sewer or at least necessitating manual removal of such refuse. Preferably this closure member is operated in conjunction with the pusher plate by means which can be controlled to ensure that it is closed at all necessary times, and both may be operated by fluid pressure from the same power source.

Other constructional features of the invention will become evident from the following description of one embodiment which is given by way of example and refers to the accompanying drawings in which:

FIGURE 1 is a diagrammatic illustration of a complete apparatus constructed according to the invention and mounted on a vehicle chassis;

FIGURE 2 is a side elevation, with the upper part shown in section, of the rear portion of the tank structure indicated in FIGURE 1 and constructed according to the invention;

FIGURE 3 is an end view of the tank structure looking in the direction of arrow "A" in FIGURE 2 but with a rear door removed;

FIGURE 4 is a separate perspective view to a larger scale of a slidable closure member and its hydraulic operating means for protecting the refuse inlet opening of the refuse tank;

FIGURE 5 is a line diagram illustrating one form of hydraulic system for operating and controlling the pusher plate and the slidable closure member;

FIGURE 6 is a fragmentary sectional view to a larger scale showing the mounting of the brushes adjustably on the pusher plate.

In these drawings, the chassis 1 of a motor vehicle has mounted upon it by bolsters 2 a tank structure indicated generally by 3. This structure includes a cylindrical shell the rear part of which constitutes a refuse tank 4 and is closable by a hinged rear door 5 which can be locked in watertight manner by engagement therewith of a series of hinged clamps 6 pivoted on brackets 7 on the shell.

The refuse tank 4 has a lining spaced from its cylindrical wall and composed of a series of perforated metal strainer plates 8 which are secured to the shell by screw-threaded studs 9 passing through spacers 10 so that the stud heads do not project inside the inner faces of the strainer plates. These strainer plates form a polygonal lining except for narrow unperforated plates 11 extending along the top of the tank. In front of the foremost plate 11 is an inlet opening 12 over which is secured a shut-off valve 13 of any suitable kind, and to this is connected a length of flexible hose 14 of about 8 inches internal diameter through which the water-borne refuse can be sucked.

At the rear of the refuse tank 4 is, at the top, a manually operated valve 15 to control an air inlet opening 16 which communicates with the interior of the tank via the passages formed between the shell 3 and the plates 8 and 11; also at the bottom is an outlet 17 for the water and other liquid removed from the refuse, a further shut-off valve 18 of any suitable kind being secured beneath this outlet.

The front part 19 of the tank structure 3 may be used as a tank for clean water, liquid disinfectant or other ancillary purposes, a delivery pipe 20 with control valve 21 being provided together with any suitable filling means. Passing through the centre of this tank 19 is a ram cylinder 22 having ports 23, 24, the port 23 having a pipe 25 leading to a union 26 near the port 24. The double-acting ram 27 has secured on its rod 28 a pusher plate 29 which is of the same polygonal shape as that formed by the plates 8 and 11 but a little smaller so as to leave a small clearance 30 all round.

The plate 29 is strengthened by a framework 31 secured to one face. Its other face has arranged around its perimeter a series of brushes 32, 32X arranged so that their "bristles," which are of galvanised wire or other suitable material, contact the plates 8 and 11 and overlap at the ends of the brushes with those of the next brush. Each brush has its body clamped in a clip 33, 33X welded to two slotted tongues 34 which are secured by bolts 35 to the pusher plate 29, whereby the brushes can be adjusted easily for wear and to ensure their proper operation and can also easily be removed and applied.

In order to produce a partial vacuum in the refuse tank 4 by means carried on the vehicle, a suction pump 36 driven from the vehicle engine is coupled by pipe 37 and shut-off valve 38 to a vacuum pipe 39 located in the space between the tank 19 and the pusher plate. Pipe 39 has its open upper end controlled by a float valve 40 arranged to close the pipe when the liquid level in tank 4 reaches the desired maximum, thus preventing the liquid from being sucked into the pump.

Longitudinally slidable in the space in front of the foremost plate 11 and between the adjacent plates 8 is a closure member 41 in the form of a slidable valve which is shaped on its base and sides like one of the plates 11. This slide valve seats across the refuse inlet opening 12 to close it and its underface forms a continuation of the tank lining over which the pusher plate and the brush 32X sweep. As shown in FIGURE 4, the valve 41 is box-shaped and secured at its closed rear end 42 to the rod 43 of a double-acting ram working in a hydraulic cylinder 44 which is mounted by a bracket 45 upon the tank shell 3. The port connections 46, 47 of this cylinder lead by pipes 48, 49 to connectors 48X, 49X for coupling to the pump which supplies hydraulic power to the pusher plate ram. In FIGURE 4 the position of the slide valve when the inlet opening 12 is closed by it is indicated fragmentarily by broken lines.

The operation of the above described apparatus is as follows. With the parts in the positions shown in FIGURE 2, valve 13 open and the hose 14 coupled to the refuse chamber which is to be emptied, the water-borne refuse is sucked into tank 4 by the partial vacuum produced therein. When the tank is full, as indicated by the closing of the float valve 40, the vacuum valve 38 and slide valve 41 are closed, outlet valve 18 is opened and the pusher plate 29 is operated to force the refuse to the rear of the tank and compress it, the surplus carrier water and all squeezed-out liquid gravitating and being pushed out through valve 18, assisted by the opening of air inlet valve 15. The pusher plate is then retracted, the valves 38 and 41 opened, valves 15 and 18 closed and the above cycle of operations repeated until the tank is full enough of solid refuse. The vehicle can then be driven away and, on opening the rear door 5 and operating the pusher plate, the load of solid refuse can be ejected for dumping or feeding into a destructor.

It will be seen that the liquid expressed from the refuse passes through the strainer plates into the spaces around them, all of which communicate with the air inlet 16 and the liquid outlet 17. The brushes sweep the plates 8 and 11 and keep the perforations clear, as without them there would be a likelihood in addition to the refuse, of the considerable amount of grease usually present in water-borne refuse blocking the perforations. At the same time these brushes serve to prevent substantially the escape of refuse through the gap 30 around the pusher plate whilst permitting the passage of air to assist the creation of the partial vacuum.

It will also be observed that any or all of the strainer plates can easily be removed for cleaning or repair and may be interchangeable.

In the hydraulic control system illustrated by way of example in FIGURE 5, a pump P draws oil from a reservoir R and has a relief valve r and passes oil to a directional control valve V of any conventional or suitable construction. This has a free-flow position F by which oil is returned to the reservoir when hydraulic power is not required. It also has four positions A, B, C, D for coupling the ports of the two cylinders 44 and 22 to the pressure and exhaust lines of the pump circuit. The arrangement is such that the pusher plate 29 cannot be operated unless the slide valve 41 is closed, and any conventional construction of the valve itself or its operating handles may be used to provide a lock between positions D and B and between positions A and C to prevent movement of the valve V until the main ram 27 has completed its cycle of operations.

Whilst the above arrangement is preferred, the most important time for the slide valve 41 to be closed is when the pusher plate is passing the inlet opening 12.

Where it is desired to produce the partial vacuum in the refuse tank by use of the suction-producing means provided in connection with the refuse collection system of the building or set of buildings, the suction-producing means on the vehicle as described above may be dispensed with or may be shut off by operation of valve 38. In that case, the outlet 17 of tank 4 is coupled to the suction pipe line of the collection system so as to draw off all surplus water and expressed liquid during the filling and compressing operations of the tank 4. The manually operated air valve 15 is not used under these conditions until the collection process is completed, when it is used to clear the static suction lines before disconnecting from the vehicle tank.

Whilst the above description has referred to the pusher plate and the closure member for the refuse inlet being operated by hydraulic rams, it is to be understood that one or both of these members might be operated by a screw-operated ram or other suitable mechanical or pneumatic means, preferably driven by the vehicle engine in the case of a vehicle-mounted apparatus.

I claim:

In apparatus for treating water-borne domestic and like refuse to separate it from its flushing water and to dispose of it, the combination of a tank having an outer shell and having in its wall near one end a suction inlet aperture for the water-borne refuse and in its opposite end an outlet opening for discharge of the solid refuse and also having a discharge outlet aperture for separated water and a valve-controlled air inlet aperture, means for producing partial vacuum conditions in said tank, sectional perforated strainer plates forming a lining for the longitudinal wall of said shell but spaced therefrom so as to leave between said shell and said plates passages communicating with said water discharge outlet aperture and said air inlet aperture, a pusher plate mounted for reciprocation within said lining longitudinally thereof so as to act as a ram and to pass said suction inlet aperture at the beginning of its compressing stroke but so as to leave a perimetral gap between it and said lining for passage of air and water, brushes mounted around the perimeter of said pusher plate and reciprocatable therewith arranged to sweep the inner faces of said strainer plates for cleaning same and to prevent substantially the escape of refuse through said perimetral gap, means for adjusting said brushes relative to said strainer plates, a longitudinally slidable closure member for said suction inlet aperture across which, when said member is in its closed position, said pusher plate moves in close association therewith, power means for reciprocating said pusher plate and said closure member, and means for controlling and co-ordinating the movements of said plate and said member whereby said suction inlet aperture is closed before the compressing stroke of the pusher plate commences.

References Cited in the file of this patent
UNITED STATES PATENTS

| | | |
|---|---|---|
| 649,413 | Luzzato | May 8, 1900 |
| 2,366,222 | Tocci-Gilbert | Jan. 2, 1945 |
| 2,488,395 | Goldberg | Nov. 15, 1949 |
| 2,537,878 | Coon | Jan. 9, 1951 |
| 2,817,288 | Peters | Dec. 24, 1957 |